N. A. SHIGON.
REFRACTOMETER.
APPLICATION FILED NOV. 1, 1909.
979,578.
Patented Dec. 27, 1910.
2 SHEETS—SHEET 2.
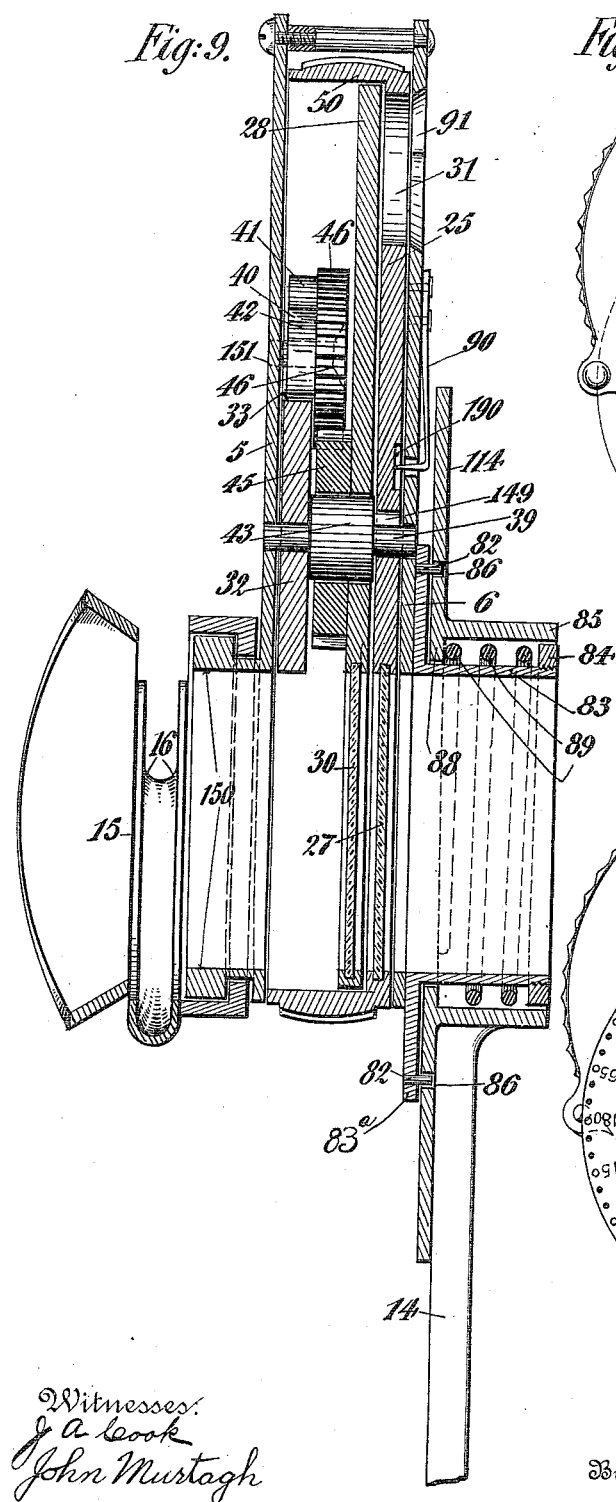
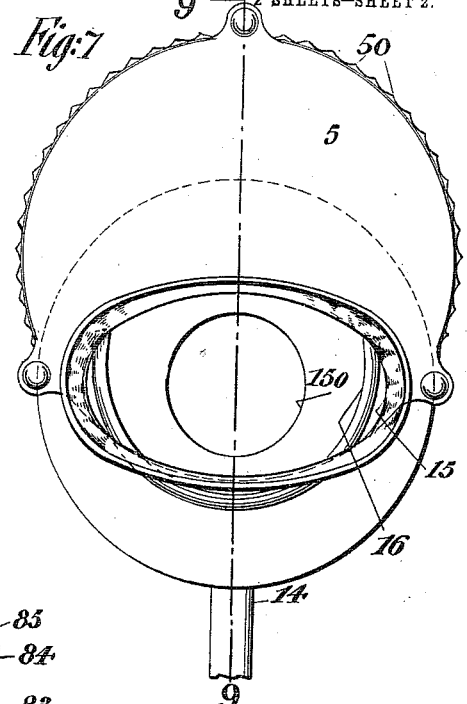
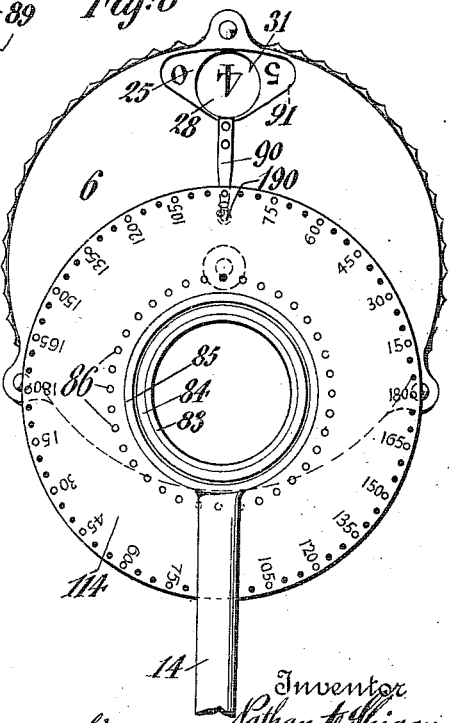
Witnesses:
J. A. Cook
John Murtagh
Inventor
Nathan A. Shigon
By his Attorneys
Goepel & Goepel

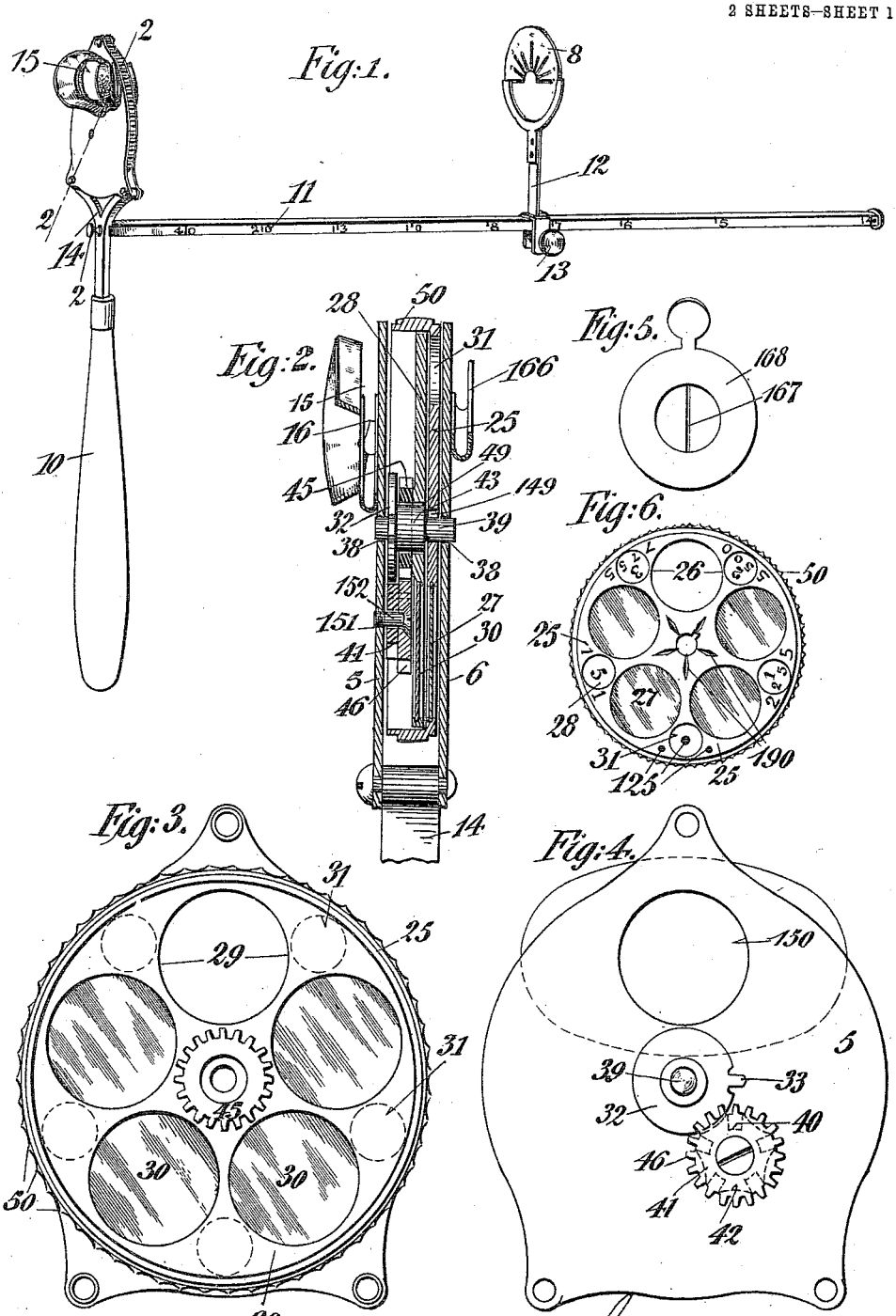

UNITED STATES PATENT OFFICE.

NATHAN A. SHIGON, OF NEW YORK, N. Y.

REFRACTOMETER.

979,578.

Specification of Letters Patent. Patented Dec. 27, 1910.

Application filed November 1, 1909. Serial No. 525,654.

*To all whom it may concern:*

Be it known that I, NATHAN A. SHIGON, a citizen of the United States, and a resident of the borough of Bronx, city and State of New York, have invented certain new and useful Improvements in Refractometers, of which the following is a specification.

This invention relates to refractometers, and has for its object to provide an optical instrument capable of diagnosing and measuring quickly and accurately errors of refraction of the human eyes, objectively or subjectively.

The object is also to provide an instrument to serve as a dynamometer for measuring the dynamic power or strength of the extrinsic muscles of the eyes for diagnosing muscular astenopia or serve for the gymnastic treatment of the extrinsic muscles of the eyes.

A further object is to be able to adapt such an instrument so that it can serve as an opthalmoscope if a reflecting mirror is arranged in front of the instrument. It has also an attachment to measure the refraction of the eyes at a near distance by which the range or amplitude of accommodation can quickly be found.

The nature of the invention consists in providing two disks, each with an opening and a plurality of lenses of different strength, which disks are shifted relatively to each other so as to superpose one lens on the other and form thereby different combinations of varying strengths, and so arrange these disks that on the complete rotation of one, the second one is shifted the distance of one lens, whereupon different combinations may be made until the rotation of the first disk is completed a second time, whereupon the second disk is again shifted the distance of one lens, this shifting of the second disk at the end of each complete rotation of the first disk, being brought about entirely automatically.

The nature of the invention consists further in providing such disks with cylindrical or prismatic lenses and shifting said battery of lenses eccentrically to the eye so as to present the axis of the cylindrical or prismatic lenses at different angular positions to the eye.

In the accompanying drawings, Figure 1 is a perspective view of my refractometer showing the same applied to a refraction rule, Fig. 2 is a section of the refractometer taken on line 2—2 through the shaft of the disk so as to show most advantageously the relation of the parts, Fig. 3 is a detail view of part of the mechanism shown in Fig. 2, Fig. 4 is also a detail view in plan of part of the mechanism, Fig. 5 is a front view of plate with a stenopaic slit, Fig. 6 is a front view of the disks shown in Fig. 3, Fig. 7 is a front view of a refractometer adapted to the use of cylindrical or prismatic lenses, Fig. 8 is a rear view of the same, and Fig. 9 is a vertical section taken on line 9—9 of Fig. 7.

Similar letters of reference indicate corresponding parts.

Referring to the drawings, a hand-support 10 is detachably connected at 2 with a graduated bar or refraction rule 11 adapted to have movable thereon a support or sliding holder 12 for holding a small card or chart 8 of test type, which support is adjustably fixed by a thumb screw 13. The support 10 has an upward extension 14 having an eye-opening 15 provided with a lens-holding slot 16 adapted to receive a lens for testing purposes. Rearward of the opening 15 and slot 16 with the lens, different test lenses are successively arranged. As is well known, first one set of lenses is used for testing, and then a second set is super-imposed thereon and moved in relation to the first set. By this arrangement different combinations of strengths may be obtained so that an accurate test of the eye may be made when the correcting lens is found.

One disk 25 with an opening 26 and plus lenses 27 rotates in respect to a second disk 28 with an opening 29 and plus lenses 30, each disk having each lens numbered to correspond to its strength as shown in Fig. 6. One of the disks 25, is provided with an opening 31 to enable the numbers of the lenses on the other disk 28 to be read. These two sets of lenses and their housing form a battery of lenses.

One of my improvements consists in providing means to bring about the automatic step-by-step movement of the second set of lenses at each complete rotation of the first set of lenses. For this purpose plates 5 and 6 of the support 14 are provided with a bearing 38 supporting an arbor 39 having a circular plate 32 with a projection 33 which at each complete revolution engages a notch 40 of a star wheel 41 having between the notches 40, curved portions 42 to prevent the star wheel from further rotation. The arbor is further provided with an enlarged portion 43 having loosely fitting thereon the disk 28 having a gear wheel 45 secured thereto, which gear wheel 45 engages a gear wheel 46 secured to the star wheel 41, which gear wheel and star wheel are rotatable on the smooth end of a partially threaded screw 152 screwed in a screw-threaded opening 151 in the plate 5. The portion 43 forms with the arbor 39 a shoulder 49 on which the first disk 25 rests. The disk 25 is secured against rotation relative to the arbor by means of a pin or lug 149 rigidly secured to the arbor and engaging the disk 25. This disk 25 is provided with a circumferential flange 50 having a milled surface for adapting it to be readily grasped by the user, which circumferential flange embraces the disk 28, but permits its free rotation in respect to it herein. By the rotation of the disk 25 by means of the milled surface on the flange 50, successively the opening 26 and each lens 27 is brought in alinement with the opening 29 and opening 150 on the plate 5. If the proper strength of lens is found before the complete revolution of the disk 25, the number is noted. If the correct lens in the first disk is not found, the rotation of the first disk is continued until the second disk receives by means of the projection 33 engaging the star wheel 41 and the meshing of the gears 45 and 46, a movement equal to the distance between two lenses. By the continued rotation of the first disk 25, the opening 26 of the first disk 25 is brought in alinement with the opening 15, at the same time as the first lens 30 of the second disk is brought in alinement with the openings 15 and 150. The first disk is then intermittently rotated until the completion of its rotation, whereupon the second disk is again shifted a short distance so as to bring the second lens 30 of the second disk in line with the opening 26 of the first disk and with the openings 15 and 150. This is continued and the different combinations of lenses made until the proper lens is found. Thereupon a notation is made of the different lenses by means of the numbers on the disks corresponding to the strength of the lenses, as shown in Fig. 6, the points 125 representing zero lenses. The shifting of the second disk relatively to the opening 15 takes place entirely automatically by the manipulation of the first disk and in such a manner that the user of the apparatus does not perceive it, whereby his attention is not in the least affected, and thereby tests are in no manner injured by such disturbance.

The holder 166 is adapted to receive a spherical lens of a certain strength so as to enable the instrument to be used for near tests. If the parts shown in Fig. 4 are assembled to the parts shown in Fig. 3, the structure shown in section in Fig. 2 is produced.

The bar 11 has divisions showing the dioptric power a normal or emmetropic eye must accommodate when the chart is at a certain division. If in the slot of the instrument a convex glass is inserted to relieve the eye of its dynamic power for near distance its *punctum remotum* or far point is brought to a nearer distance. By moving the chart nearer to the eye, until the eye accommodates itself to its utmost still with a clear vision, the *punctum proximum*, or near point is found, the distance between the far point and the near point determining the amount of accommodation. The range or amplitude of accommodation is readable by the divisions stamped on the bar in inches, centimeters, or dioptrics, or in all of them.

If the *punctum remotum* or far point is farther away than the focal distance of the inserted lens, the divisions farther than the focal point of this particular lens will show how many dioptrics and fractions of the same, the eye is hypermetropic or far sighted. If nearer to the eye than the focal point, the divisions will show how many diopters and fractions of the same, the eye is myopic or near sighted. In making these tests it is usual to cover the other eye by means of any suitable and well known attachment.

If in the slot 16 a stenopaic slit 167 of a frame 168 is inserted in vertical position and a plus lens is placed in the holder 166 to relieve the eye of its dynamic power, the *punctum remotum* of one meridian of the eye may be found by means of the shifting of the test print on the rule to a certain dioptric mark on the same. If the stenopaic slit 167 in the slot 16 is shifted so as to be at right angles to the first position or is horizontally placed, the *punctum remotum* of the other meridian may be found which is then either in the same position of the test print on the rule as for the vertical test or in a different position, in which latter case the test print must be correspondingly shifted. If the *punctum remotum* of the second meridian is at a different position than the *punctum remotum* of the first meridian, then the difference between one *punctum remotum* and the other will indicate the dioptric power of its hypermetropic or myopic, compound or mixed astigmatism.

By the application of my improvements, the *punctum remotum* of one meridian can also be found by the fixing of the position of the test print on the rule, corresponding to the usual reading distance of that particular person when looking through the stenopaic slit by means of the aid of the strongest plus lens in the battery, obtained by the shifting of one disk relatively to the other, instead of the shifting of the test print as before described. If the stenopaic slit is shifted at right angles to the first position, the *punctum remotum* of the other meridian requires another lens, which is found by shifting of the lenses until the lens for that meridian is found, the test print remaining in fixed position. The respective readings are noted, and the difference between one *punctum remotum* and the other will give the dioptric power of its hypermetropic or myopic compound or mixed astigmatism. For distance correction subtract the accommodation power required for that particular place on the bar or the dioptric power stamped on it.

If minus lenses are required instead of plus lenses, a stronger minus lens than the strongest plus lens in the battery is inserted in the holder 166, or in slot 16. By the difference between the plus and minus lenses, the dioptric power is ascertained. These tests just mentioned are subjective tests.

The second part of my improvement consists in providing the disks 25 and 28 with minus cylindrical lenses and arranging the disks so that the axes of these lenses are in alinement with the openings 15 and 150. Assuming that in an astigmatic chart certain of the lines are clearest when looking only through the spherical plus lens placed in the slot 16 and assuming the clearest lines to be vertical, the battery of lenses is then placed at right angles to these most clearly visible lines, which will bring the axes of the cylindrical lenses in the disks to a horizontal position, then by shifting the disks 25 and 28 with the cylindrical lenses until all lines on the astigmatic chart are clearly perceived in true relation, the dioptric power of the minus cylinder lens is determined, which shows the astigmatism of the person. By this test, which is also a subjective test, the dioptric power of one meridian is ascertained by the position of the test print on the rule, and the lens which is inserted in the slot, and the power of the other meridian is ascertained by the angular position of the battery and the reading of the numbers of the minus cylindrical lenses. The test applies also to distant tests. If any other lines than the vertical are the clearest lines, then the battery is moved at right angles to the position of clearest lines, to determine the astigmatism of the other meridian. In the embodiment showing these improvements, the disks are in the same manner as before described supported between two walls, a front wall 5 and a rear wall 6, and these two walls with the disks between them form the battery of lenses. In order that the walls with disks may be eccentrically rotatable upon the upper end of the support 14 a cylindrical projection 83 having an outwardly-extending flange 84 is rotatably supported in a cylindrical extension 85 on the support 14, the support 14 being provided with openings 86 adapted to be engaged by pins 82 carried by an annular flange 83ª at the inner end of the cylindrical projection 83. Between the flange 84 and an inwardly-projecting flange 88, a helical spring 89 is arranged, which serves to hold the flange 83ª in contact with the disk 114 and the pins 82 in the openings 86. The disk 114 has angular markings thereon from 0 to 180 on both sides of a diametrical line, as shown in Fig. 8, whereby the position of the battery of lenses is indicated by means of the spring-finger 90. The end of the finger 90 engages in slots 190 in the disk 25 (see Figs. 6, 8 and 9). The object of the finger 90 engaging the slots 190 is to hold the disk temporarily in position. The rear wall 6 is also provided with an opening 91 through which the readings on the disk may be made.

To change the position of the battery of lenses, the battery is moved away from the support, the helical spring 89 being compressed thereby, and the pins 82 disengaged from the openings 86 whereby the battery of lenses may be readily shifted to any angular position. When the desired position is found, the battery is permitted, under the action of the spring 89, to resume its normal position and the pins are thereby again brought into engagement with the openings of the support. The operation of the disks 25 and 28 is the same as described in connection with Figs. 1 to 6.

When the refractometer is used in objective tests with plus spherical lenses in skiascopia, the patient keeps the instrument close to his eye while the examiner sits at a distance with a skiascopical mirror in his hand. By throwing the reflecting light from any source into the patient's eye the returning rays will show what kind of lenses must be put before the patient's eye, if plus lenses, the examiner turns with his finger the milled disk of the refractometer or the patient is ordered to do so. Plus lenses will appear before the patient's eye each one stronger than the preceding by $\frac{1}{4}$ of a diopter until a six diopter lens, by combination, will be before the patient's eye. If a stronger one is required a plus $6\frac{1}{4}$ lens is inserted in the slot and the lenses added as before by the rotation of the disk. If minus lenses are required, minus $6\frac{1}{4}$ or a stronger one is inserted in the slot and the milled disk is turned in the opposite direction and a plus 6 diopter lens and less is brought before the eye until neutralization is found by combining the minus lens with the plus lenses in the indicator, the resultant will be the minus lens required. The refractometer may also be used as a dynamometer. In this case the disks are provided with prismatic lenses and the milled disk rotated so as to present one prism stronger than the previous one before the patient's eye. The base or apex lines are brought up or down, in or out, to different axes or meridians. By the reciprocatory movement of the lenses, first a weaker one then a stronger one, the muscles of the eye are tested or exercised, and by the different angular positions of the battery of lenses different sets of muscles may be tested or exercised.

A test for presbyopia is carried out by finding the patient's amplitude of accommodation by moving the chart on the bar or by inserting plus lenses in the battery before the patient's eye or in both ways. Adjust slide and chart on bar to the required reading or working distance of the patient. Give the weakest plus lens, plus ¼ of the patient's amplitude of accommodation, and this will be the most satisfactory lens for reading or working.

I claim:

1. In a refractometer having a lens disk with an opening and lenses, and a second lens disk with an opening and lenses movable in respect to the first disk, a cam-follower on one lens disk, a gear on the other lens disk, a starwheel intermittently engaged by the cam-follower, and a gear-wheel carried by the starwheel and engaging the first named gear-wheel and so arranged that on each complete rotation of the first lens disk the second lens disk is rotated the distance of one lens.

2. In a refractometer having a support with openings and with a sight-opening, lens disks with openings and lenses movable in respect to each other, a casing for said lens disks rotatable with respect to the sight-opening and having pins engaging the openings in the support, and a spring interposed between the casing and support arranged to permit the movement of the casing in relation to the support so as to permit the disengagement of the pins from the openings in the support.

3. In a refractometer, an arbor, a lens disk having an opening and lenses connected to the arbor, a second lens disk freely rotatable on the arbor, and means to keep the second disk from rotation until the first disk makes one complete rotation.

4. In a refractometer, the combination of a pair of disks, a starwheel having an operative connection with one of the disks, and a revoluble part having an operative connection with the other disk, and having a projection adapted to engage said starwheel.

5. In a refractometer, the combination of a pair of disks, a starwheel having an operative connection with one of the disks, and a revoluble part having an operative connection with the other disk, and having a projection adapted to engage said starwheel, one of said connections comprising relatively movable parts.

6. In a refractometer, the combination of a pair of disks, a starwheel having an operative connection with one of the disks, and a revoluble part having an operative connection with the other disk, and having a projection adapted to engage said starwheel, one of said connections comprising a series of gear-wheels.

7. In a refractometer, a disk having a projection, a starwheel engageable by the projection at its complete rotation, a second disk, and gear-wheels operatively connecting the second disk and the starwheel.

8. In a refractometer, the combination of a rotatable lens disk having a projection movable therewith, a rotatable starwheel adapted to be engaged and rotated by said projection at each rotation of the disk, a second rotatable lens disk, and an operative connection between the second lens disk and the starwheel.

9. In a refractometer, the combination of a rotatable lens disk having a projection movable therewith, a rotatable starwheel adapted to be engaged and rotated by said projection at each rotation of the lens disk, a second rotatable lens disk, and gear-wheels for transmitting motion from the starwheel to the second lens disk.

10. In a refractometer, the combination of a support, an arbor supported thereon, a pair of lens-carrying disks rotatably mounted on said arbor, and motion-communicating means operatively connecting said disks.

11. In a refractometer, the combination of an arbor, a lens-carrying disk rotatably mounted on said arbor, an additional lens-carrying disk mounted on said arbor and having a flange partially inclosing and forming a housing for the first named disk.

12. In a refractometer, the combination of, a support, a member pivoted to said support, an arbor carried by said member at a point removed from the pivoted connection with said support, a pair of lens disks rotatably mounted on said arbor, and motion communicating means operatively connecting said disks.

13. In a refractometer, the combination of a support having a cylindrical extension having an inwardly-projecting flange, a casing having a cylindrical projection engaging in said extension and having an outwardly-projecting flange, a spiral spring interposed between said flanges, and lens-carrying disks rotatably mounted in said casing.

14. In a refractometer, the combination of an upright hand-support provided at its upper end with a cylindrical extension having an inwardly-projecting flange and surrounded by a graduated perforated disk, a casing having front and rear spaced plates having registering openings, said rear plate having a cylindrical projection in alinement with said openings engaging in said cylindrical extension, an outwardly-projecting flange on the free end of said projection, a spiral spring interposed between said extension and projection and said flanges, pins supported from the inner end of the cylindrical projection and adapted to engage in the perforations of said disk, and lens-carrying disks rotatably mounted in said casing.

15. In a refractometer, the combination of an upright support provided at its upper end with a cylindrical extension, a casing having a cylindrical projection engaging in said cylindrical extension whereby said casing may be angularly adjusted relative to said support, and means for holding said casing in adjusted position.

16. In a refractometer, the combination of a casing having front and rear spaced plates having registering openings, an arbor rotatably supported between said plates, a flanged lens-disk on said arbor and held against rotation thereon and having slots in its rear face, an inner lens-disk rotatably mounted on said arbor and housed by said flanged disk and one of said plates, a gear-wheel rigidly secured to the inner lens disk and concentric therewith, a starwheel rotatably supported from one of said plates, a gear-wheel rigidly secured to said starwheel and engaging said first named gear-wheel, a circular plate rigidly mounted on said arbor and having a projection adapted to engage said starwheel, series of lenses carried by said lens-disks and adapted to register with said registering openings, a spring-finger engaging the slots of said flanged disk, and a lens-holding slot or slots adapted to hold a lens in alinement with said registering openings.

17. In a refractometer, the combination of a casing comprising spaced plates having registering openings, an arbor rotatably supported between said plates, a pair of lens-disks mounted on said arbor, one of which is held against rotation relative to said arbor and one of which is provided with a flange forming a partial housing for the other disk, a circular plate provided with a projection rigidly mounted on said arbor, a starwheel rotatably supported from one of said spaced plates and adapted to be engaged by said projection, a gear-wheel rigidly secured to said starwheel, and an additional gear-wheel engaging said first named gear-wheel and rigidly secured to the lens-disk which is not held against rotation relative to said arbor.

18. In a refractometer, the combination of a casing comprising spaced plates, an arbor rotatably supported between said plates, a flanged lens-disk attached to said arbor and held against rotation thereon and having openings, an inner lens-disk rotatably mounted on said arbor and housed by said flanged lens disk and one of said plates and having numbers in registration with the openings of the flanged lens disk, a gear-wheel rigidly secured to the inner disk, a starwheel rotatably supported from one of said plates, a gear-wheel rigidly secured to said starwheel and engaging said first named gear-wheel, and a circular plate rigidly mounted on said arbor and having a projection adapted to engage said starwheel.

19. In a refractometer, the combination of an upright hand-support provided at its upper end with a cylindrical extension having an inwardly-projecting flange and surrounded by a graduated and perforated disk, a casing having front and rear spaced plates having registering openings, said rear plate having a cylindrical projection in alinement with said openings and engaging in said cylindrical extension, an outwardly-projecting flange on the free end of said projection, a spiral spring interposed between said extension and projection and said flanges, pins supported from the inner end of the cylindrical projection and adapted to engage in the perforations of said disk, an arbor rotatably supported between said plates, a flanged lens-disk on said arbor and held against rotation thereon and having slots in its rear face, and openings, an inner lens-disk rotatably mounted on said arbor and housed by said flanged disk and one of said plates and having numbers in registration with the openings of the flanged lens-disk, a gear-wheel rigidly secured to the inner disk and concentric therewith, a starwheel rotatably supported from one of said plates, a gear-wheel rigidly secured to said starwheel and engaging said first named gear-wheel, a circular plate rigidly mounted on said arbor and having a projection adapted to engage said starwheel, series of lenses carried by said lens-disks and adapted to register with said registering openings, a spring-finger engaging the slots in said flanged disk, and lens-holding slots adapted to hold a lens or lenses in alinement with said registering openings.

In testimony, that I claim the foregoing as my invention, I have signed my name in presence of two subscribing witnesses.

NATHAN A. SHIGON.

Witnesses:
PAUL GOEPEL,
J. A. COOK.